Sept. 14, 1965  E. F. WARD  3,205,807
BY-PASS FLOW CONTROL
Filed Sept. 3, 1963  2 Sheets-Sheet 1
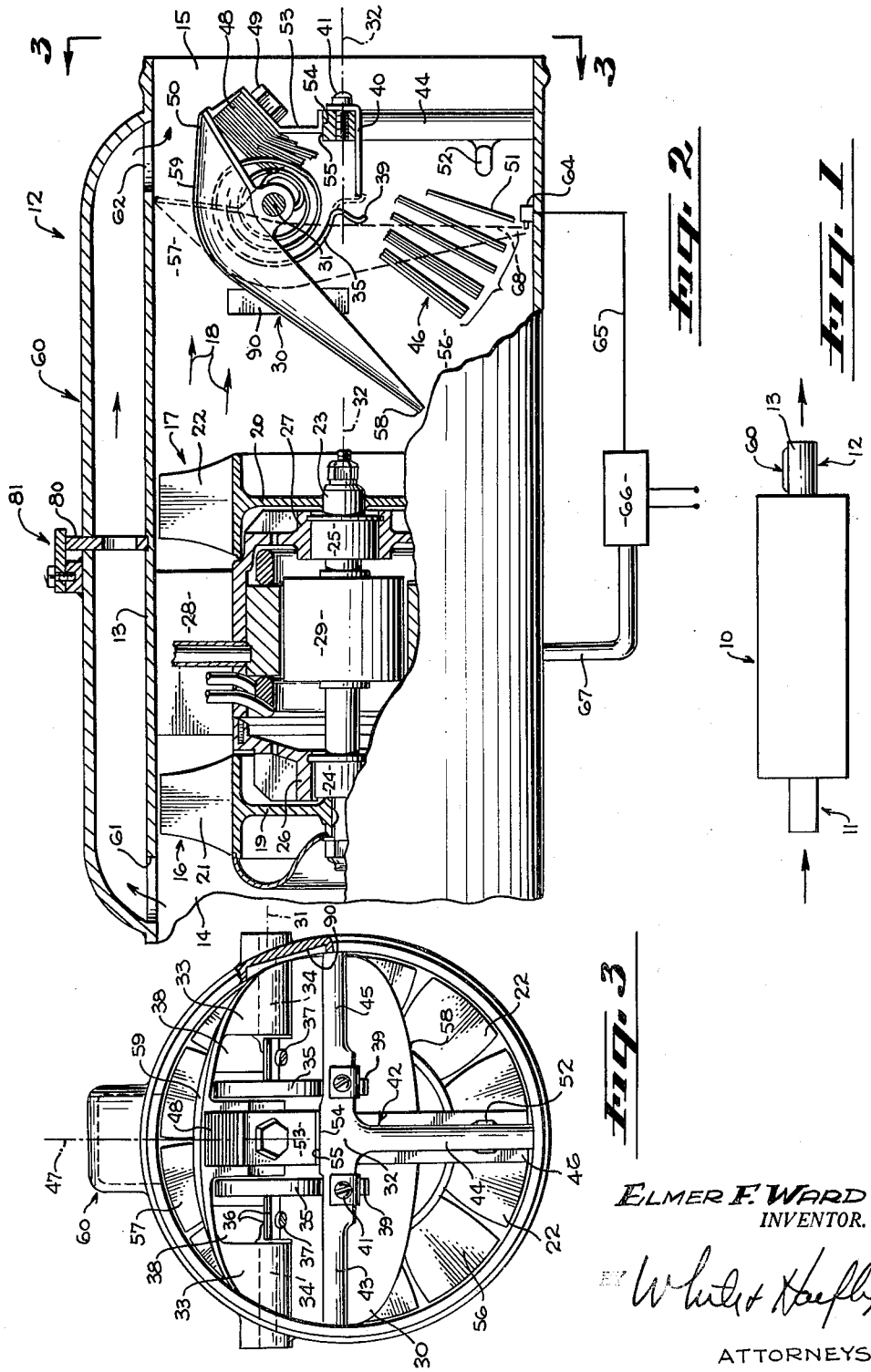
ELMER F. WARD
INVENTOR.
ATTORNEYS Sept. 14, 1965   E. F. WARD   3,205,807
BY-PASS FLOW CONTROL
Filed Sept. 3, 1963   2 Sheets-Sheet 2

INVENTOR.
ELMER F. WARD
BY White & Haefliger
ATTORNEYS.

United States Patent Office 3,205,807
Patented Sept. 14, 1965

3,205,807
BY-PASS FLOW CONTROL
Elmer F. Ward, Santa Ana, Calif., assignor to Task Corporation, Anaheim, Calif., a corporation of California
Filed Sept. 3, 1963, Ser. No. 306,379
16 Claims. (Cl. 98—1.5)

This is a continuation-in-part of application Serial No. 88,070, filed February 9, 1961, now abandoned.

This invention relates generally to apparatus for controlling gas flow between upstream and downstream zones at higher and lower pressures respectively. More specifically, it concerns improvements in flow control assemblies characterized as functioning to maintain substantially constant the mass flow of air between such zones.

In the maintenance of aircraft cabin pressurization it is desirable to maintain a condition of substantially constant mass flow of air into and out of the cabin pressurization zone for proper ventilation. This condition must be maintained for all design flight altitudes, requiring the use of a device for controlling the escape of air from the constant pressure cabin to the exterior where the air pressure drops with increasing altitude. Known flow control devices seek to maintain a constant mass discharge flow of air through the use of butterfly type valves which move to decrease the flow area in a discharge conduit in response to an increasing tendency of the air in the upstream zone to escape to the exterior, due to lowering of exterior air pressure with altitude.

Such known butterfly valves have limiting positions at which all escaping air flows through a variable main orifice or orifices adjacent edge extent of the valve having maximum travel in the conduit, the escaping flow then being supersonic so that the mass flow is constant as determined by the difference between the cabin or upstream air pressure and the exterior or downstream pressure. Accordingly, the variable main orifice is reduced to such size as will pass a particular mass flow at supersonic conditions such as is desirable for ventilation purposes. However, due to physical requirements including the use of a movable spring for biasing the valve, and which extends in the direct path of the escaping air flow, the main orifice must be made adjustable and calibrated in each instance to limit the closure of the butterfly valve at that point for which the design mass flow results under supersonic air flow conditions. This requirement introduces the need for an adjustable stop means and increases the risk of malfunction of the valve and the adjustable stop means, including dangerous complete closure of the butterfly valve, so that definite problems exist as respects equipment of this type.

The present invention is directed to a solution of the problems discussed above, and is predicated in part upon the insight that the flow under supersonic conditions may be passed from the upstream to the downstream side of the valve through orifice means which is auxiliary to the variable area main orifice, and furthermore which has flow area which remains entirely independent of valve movement. As conceived in one of its specific forms, the auxiliary orifice means comprises an auxiliary conduit by passing the main orifice means, and the flow area of which is fixed at all times. Accordingly, there is no need for adjustable stop means to limit shutting of the damper, and the escaping supersonic flow by-passes around the closed damper. Furthermore, the axial blower normally operating to discharge air toward the valve may be shut off when the main valve is completely closed, at which times the supersonic air flow by-passes both the blower and the main valve.

As appeared from the description in the original application, and as appears herein, the invention also contemplates the provision of a novel and unusual assembly for controlling gas flowing downstream in a flow conduit having a by-pass outlet through which gas may leave the conduit. The assembly typically includes a conduit section for passing gas flow and a damper valve movable in said conduit section to decrease the flow area of a main orifice formed therein all in response to increasing differential pressure of said gas upstream and downstream of the damper valve. The valve is mounted for pivotal movement about an axis extending generally transversely of the conduit section and eccentrically spaced from the principal axis of the section. Further, a major portion of the damper always projects upstream from a plane passing normal to the principal axis of the conduit and through the pivot axis, and the conduit section is substantially completely closed by the valve in closed position. Provision may be made for substantially complete opening of the conduit section at the valve in extreme open position, and the valve may have a substantially flat upstream side, with upstream and downstream extremities of the valve in closed position extending into close proximity to the inner surface of the conduit section. Finally, the damper may have a convex upstream side, with the entire periphery extending closely proximate the conduit section inner surface in damper closed position, the damper itself being imperforate to prevent gas flow therethrough; and resistance to damper pivoting may be provided by a series of spring elements mounted to be successively and cumulatively deflected in response to such damper pivoting toward closed position.

These and other objects and advantages of the invention, as well as the details of illustrative embodiments, will be more fully understood from the following detailed description of the drawings, in which:

FIG. 1 is a schematic showing of an aircraft cabin air pressurizing and dumping system;

FIG. 2 is a sectional elevation partly broken away to show the interior of the air flow control apparatus;

FIG. 3 is an end view taken on line 3—3 of FIG. 2;

Figure 6:
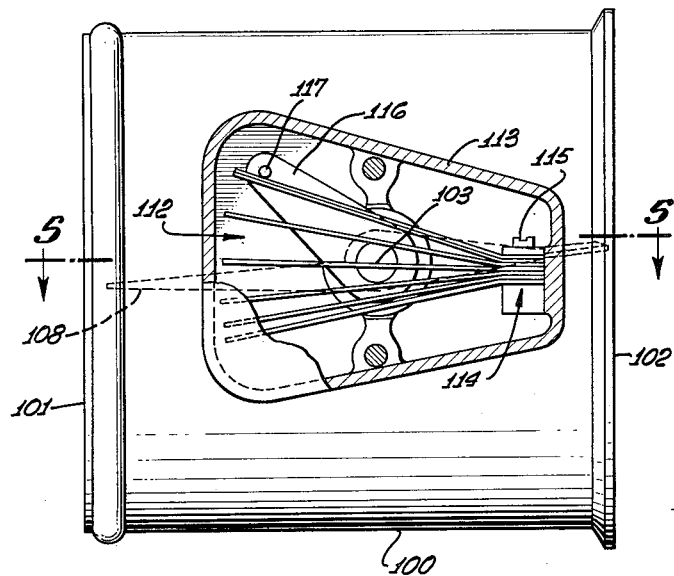
FIG. 6 is an elevation, partly in section, showing a modified spring arrangement to resist closing of the FIGS. 4 and 5 damper valve.

IN FIG. 1 the aircraft cabin is schematically shown at 10, and pressurizing equipment is shown at 11 for introducing air into the cabin to maintain the interior of the latter at desired pressure. For ventilation purposes, it is desirable that there be a predetermined mass flow of air into and out of the cabin 10 while the latter is kept under desired pressurization. Accordingly, an air dumping and flow control apparatus is shown at 12 for controlling gas flow between an upstream zone, i.e. the interior of the cabin, and a downstream zone, as for example the exterior.

The improved apparatus 12 is shown in FIG. 2 to comprise an assembly that includes a flow conduit 13 having an upstream entrance end 14, and a downstream exit end 15. Air entering the conduit at 14 passes first through axial blower stages generally indicated at 16 and 17 and operable to compress the air for rightward discharge as indicated by the arrows 18. The axial blowers 16 and 17 may comprise hub 19 and 20 mounting suitable vanes 21 and 22, and being mounted on a common shaft 23. The latter is supported for rotation by bearings 24 and 25 within stationary structure 26 and 27 joined at 28 to the conduit 13. The structure 28 may comprise fixed vanes circularly spaced about the shaft 23 for guiding the flow between the first and second blower stages. A suitable electric motor is shown at 29 for rotating the shaft 23.

Located downstream of the last blower stage 17 and within a section of the conduit 13 is a valving means, typically in the form of a damper or butterfly valve 30 having a generally convex side facing upstream within the conduit. The valve is mounted to rotate about an axis 31 extending transversely of the conduit and eccentrically offset from the conduit axis 32. For this purpose, the valve is provided with integral bearings 33 at the downstream side thereof, the bearings being located in transversely spaced apart relation as best seen in FIG. 3. The bearings in turn receive the inwardly projecting terminal ends of trunnions 34 integral with the flow conduit means, and the trunnions and bearings have a common axis 31. Accordingly, the valve is rotatable from an open position as shown in full lines in FIG. 2 to a fully closed position, as shown in broken lines in FIG. 2. In this connection, opening of the valve is accommodated by reliefs 90 at opposite sides of the conduit 13.

Such rotation of the valve toward closed position occurs in response to air stream loading exerted against the upstream facing side of the valve, and it will be understood that rotation of the valve toward closed position is resisted by structure now to be described. As shown in FIGS. 2 and 3, a pair of coil springs 35 are located in transversely spaced apart relation at the downstream side of the valve 30, and each spring has its innermost end retained between a pair of transversely extending plates 36. The transverse terminal end portions of the plates are joined by connectors 37 to flanges 38 integral with the bearings 33 on the valve, and accordingly the coil springs 35 are rotated with the valve. The outer terminal ends of the coil springs 35 are shown at 39 in FIG. 2 as being rotatable into engagement against the upstream projecting ends of brackets 40, the latter being held in fixed position relative to the flow conduit 13 by connection at 41 to a spider 42. The latter has arms 43, 44 and 45, the terminal ends of which are connected to the flow conduit as shown. Accordingly, once the terminal ends 39 of the coil springs come into engagement with the bracket 40, further closing movement of the damper valve is increasingly resisted by the coil springs.

Additional resistance to closing of the damper valve is provided by a series of leaf springs 46 generally centered with respect to a vertical plane 47 through the axis 32 and at the downstream side of the damper valve. The springs 46 have their uppermost end extents 48 integrally connected at 49 to the upper extent 50 of the damper valve, whereas the downwardly projecting extents of the springs are relatively spaced apart, as shown, in the path of damper movement toward closed position. Accordingly, as the damper so moves, the lower extents of the springs 46 rotate counterclockwise in FIG. 2, and are drawn slightly upwardly. This spring movement is progessively arrested after spring 51 engages the stop 52 since the leaf springs 46 progressively close together in sequence after spring 51 has engaged the stop 52. Cumulative flexing of the leaf springs as the damper closes contributes to the increasing resistance to closing movement of the damper valve. A bracket 53 integrally connected at 49 to the damper valve upper extent 50 has a shoulder 54 adapted to seat against upper facing shoulder 55 on the spider 42 to limit opening movement of the valve, as shown in FIGS. 2 and 3.

A pair of main orifices are seen to be formed in FIG. 3 at 56 and 57 between the bore of the conduit 13 and the lower and upper terminal edges 58 and 59 of the damper. As the damper progressively closes within the conduit it is clear that the flow areas of these main orifices are decreased until they are substantially eliminated when the valve is completely closed. An auxiliary airflow conduit is shown at 60, outside the main conduit 13, the auxiliary conduit having an inlet 61 (constituting a side outlet for main conduit 13) and communicating with the interior of the main conduit upstream of the axial blower stages 16 and 17. Also, inlet 61 may be considered as a flow by-passing outlet from the conduit 13. The auxiliary conduit also has an outlet 62 (constituting a side inlet for main conduit 13) and communicating with the main conduit 13 downstream of the valve 30, as illustrated, so that air entering the auxiliary conduit completely by-passes the blower stages and the main valve. Accordingly, when the damper valve is closed, substantially all the flow escapes through the auxiliary conduit 60 under supersonic flow conditions, whereby the mass flow is determined by the difference in pressure at location upstream of the blower and downstream of the valve 30. Furthermore, as the latter moves toward closed position, the amount of air escaping through the auxiliary conduit 60 increases in relation to the amount of air escaping through main orifices 56 and 57. A replaceable orifice means typically in the form of a plate is retained at 81 in conduit 60. Other size orifice plates may then be substituted for plate 80 to vary the flow conditions without materially altering other construction features.

Means for shutting off the motor 29 driving the blower stages 16 and 17 is shown in FIG. 2 to include a microswitch 64 having electrical connection at 65 to a relay 66 to which the motor leads are connected through conduit 67. Accordingly, as the terminal end 58 of the damper arrives at the broken line position 68 in FIG. 2, the microswitch is actuated to shut off the blower, and substantially all the escaping air then escapes through auxiliary conduit 60 which is sized to pass the desired mass flow of air under supersonic flow conditions. Under these conditions, the pressure at the upstream side of the damper is close to cabin pressure, whereas the pressure at the downstream side of the damper is greatly reduced at high altitude. The blower primary function is to aid circulation of air through the cabin at ground level and lower altitudes.

Figure 4:
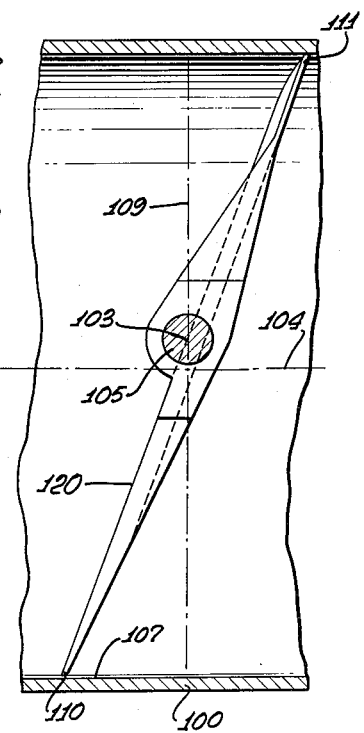
FIGS. 4 and 5 illustrate another form of damper valve, in edge and plan view respectively.
Figure 5:
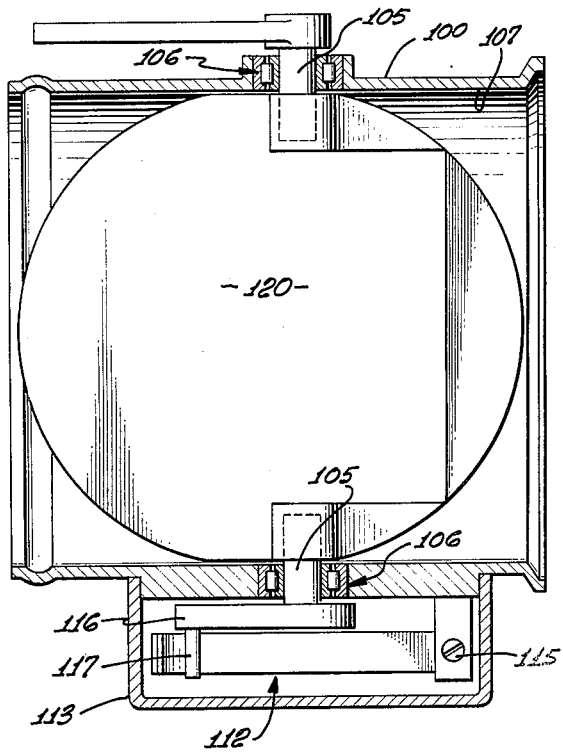

In the form of the invention seen in FIGS. 4–6, the assembly includes a flow conduit section 100 having an upstream entrance end 101 and a downstream exit end 102. The said ends are specially formed for connection into a principal conduit, making the section a part thereof, as for example in the sense of FIGS. 1–3 wherein a section of conduit 13 contains the damper valve therein shown.

Located within the section 100 is a valving means, typically in the form of a damper 120 mounted to rotate about an axis 103 extending transversely of the conduit and eccentrically offset from the conduit axis 104. For this purpose, the valve carries trunnions 105 projecting transversely and within bearing structure 106 carried by the conduit immediately outside the conduit bore or internal periphery 107. Accordingly, the damper is rotatable from an open position as shown by broken lines 108, the conduit section then being substantially completely open, to a fully closed position as shown by the full lines in FIG. 4, wherein the valve curved periphery fits the conduit bore to substantially close the latter. At this time, the valve extends generally in a plane which is tilted about the axis 103 with respect to a plane 109 passing through said axis and normal to the conduit axis 104, whereby the terminal edges 110 and 111 of the valve which are forwardmost and rearwardmost respectively are spaced upstream and downstream of the plane 109. Also, a major portion of the damper or valve projects upstream from plane 109. This is also true of the damper 30 in FIGS. 2 and 3, a major portion thereof projecting upstream from a plane normal to axis 32 and passing through axis 31.

The assembly also includes yieldable means for increasingly resisting damper pivotal movement toward closed position, one such means comprising a series of leaf springs 112 located within a chamber 113 at the outside of the flow conduit. The springs have their terminal ends 114 suitably attached as at 115 to the chamber structure, whereby the springs then project with cantilever relationship generally parallel to the conduit axis 104 so as to be successively flexed in response to rotation of the damper valve. For this purpose, a crank member 116 is carried by one trunnion 105 to have a lug 117 rotatable generally counterclockwise in FIG. 6 as the damper closes, thereby to engage the uppermost flat spring, as shown. As the lug continues to rotate with the damper, successive springs are engaged cumulatively to increase the resistance to damper pivotal movement until all of the springs are stacked in flexed condition when the damper is completely closed. At that time, when the valve is used as in FIG. 1, the flow by-passes the valve as through outlet 61 in the main conduit.

I claim:

1. In apparatus for controlling gas flow, an improved flow control assembly comprising flow conduit means having upstream and downstream zones and including a principal conduit and valving means movable therein to decrease the flow area of main orifice means formed by said assembly within said principal conduit all in response to increasing differential gas pressure in said zones, blower means upstream of said valving means and located to displace gas downstream against said valving means, said flow conduit mens including an auxiliary conduit for by-passing gas around said blower means and said main orifice means, the flow area of said auxiliary conduit remaining independent of movement of said valving means, whereby as said differential gas pressure increases, the amount of gas passing through said auxiliary conduit increases in relation to the amount of gas passing through said main orifice means.

2. In apparatus for controlling gas flow, an improved flow control assembly comprising flow conduit means having upstream and downstream zones and including a principal conduit and valving means movable therein to decrease the flow area of main orifice means formed by said assembly within said principal conduit all in response to increasing differential gas pressure upstream and downstream of said valving means, means for resisting said valving means movement, blower means upstream of said valving means and located to displace gas downstream against said valving means, and said flow conduit means including an auxiliary conduit for by-passing gas around said blower means and said main orifice means, the flow area of said auxiliary conduit remaining independent of movement of said valving means, whereby as said differential gas pressure increases, the amount of gas passing through said auxiliary conduit increases in relation to the amount of gas passing through said main orifice means.

3. In apparatus for controlling gas flow, an improved flow control assembly comprising flow conduit means having upstream and downstream zones and including a principal conduit and valving means movable therein to decrease the flow area of main orifice means formed by said assembly within said principal conduit all in response to increasing differential gas pressure upstream and downstream of said valving means, means for resisting said valving means movement, blower means upstream of said valving means and located to displace gas downstream against said valving means, and said flow conduit means including an auxiliary conduit for by-passing gas around said blower means and said main orifice means, the flow area of said auxiliary conduit remaining independent of movement of said valving means, whereby as said differential gas pressure increases, the amount of gas passing through said auxiliary conduit increases in relation to the amount of gas passing through said main orifice means, said valving means having a terminal position in which said main orifice means is substantially closed at times when the flow through said auxiliary conduit means is supersonic.

4. The invention as defined in claim 3 in which said valving means comprises a damper mounted for pivotal movement about an axis extending generally transversely of said principal conduit, said damper substantially closing said principal conduit in said terminal position thereof.

5. The invention as defined in claim 4 including means for shutting off said blower means in response to movement of the damper to terminal position.

6. The invention as defined in claim 5 in which said principal conduit has a principal axis with respect to which said damper pivot axis is eccentrically spaced, and said means for resisting said valving means movement includes coil and leaf spring elements which extend in the space between said damper pivot axis and a plane extending generally parallel to said damper pivot axis and containing said conduit principal axis.

7. The invention as defined in claim 3 in which said flow conduit means includes an aircraft cabin having an inlet section containing air pressurizing equipment for maintaining the cabin interior at desired pressure, said cabin being upstream of said principal conduit.

8. For combination with apparatus including flow conduit means and means operable to effect flow of gas downstream in the flow conduit means, the improvement comprising a flow control assembly including a principal conduit for series communication with said flow conduit means, and a damper valve movable in the principal conduit to decrease the flow area of a main orifice formed therein all in response to increasing differential pressure of said gas upstream and downstream of the damper, means mounting the damper for pivotal movement about an axis extending generally transversely of the principal conduit, said principal conduit having a principal axis with respect to which said damper pivot axis is eccentrically spaced, and yieldable spring means outside the interior of the principal conduit for increasingly resisting damper pivot movement as the damper pivots toward closed position, a major portion of the damper projecting upstream from a plane normal to the principal axis of the conduit and passing through said transverse pivot axis.

9. For combination with apparatus including flow conduit means and means operable to effect flow of gas downstream therein, the flow conduit means including a gas by-passing side outlet remaining open, the improvement comprising a flow control assembly including a principal conduit for series communication with said flow conduit means downstream of said side outlet, and a damper valve movable in the principal conduit to decrease the flow area of a main orifice formed therein all in response to increasing differential pressure of said gas upstream and downstream of the damper, means mounting the damper for pivotal movement about an axis extending generally transversely of the principal conduit, said principal conduit having a principal axis with respect to which said damper pivot axis is eccentrically spaced, and yieldable spring means for increasingly resisting damper pivotal movement as the damper pivots toward closed position, whereby as said differential gas pressure increases, the amount of gas passing downstream through said side outlet increases in relation to the amount of gas passing through said main orifice means, a major portion of the damper projecting upstream from a plane normal to the principal axis of the conduit and passing through said transverse pivot axis.

10. For combination with means including a flow conduit for passing gas downstream and the conduit having an outlet through which gas may leave the conduit, the improvement assembly comprising a conduit section for passing gas flow, and a damper valve movable in said conduit section to decrease the flow area of a main orifice formed therein all in response to increasing differential pressure of said gas upstream and downstream of the damper valve, means mounting the damper valve for pivotal movement about an axis extending generally transversely of the conduit section, said section having a principal axis with respect to which said damper pivot axis is eccentrically spaced, a major portion of the damper projecting upstream from a plane normal to the principal axis of the conduit and passing through said transverse pivot axis in both open and closed positions of the damper, said conduit section being substantially completely closed by the damper valve in said closed position, and yieldable spring means for increasingly resisting damper pivotal movement as the damper pivots toward closed position.

11. For combination with means including a flow conduit for passing gas downstream and the conduit having an outlet through which gas may leave the conduit, the improvement assembly comprising a conduit section for passing gas flow, and a damper valve movable in said conduit section to decrease the flow area of a main orifice formed therein all in response to increasing differential pressure of said gas upstream and downstream of the damper valve, means mounting the damper valve for pivotal movement about an axis extending generally transversely of the conduit section, said section having a principal axis with respect to which said damper pivot axis is eccentrically spaced, a major portion of the damper projecting upstream from a plane normal to the principal axis of the conduit and passing through said transverse pivot axis in both open and closed positions of the damper, said conduit section being substantially completely open at the location of the damper valve when said valve is at extreme open position, and yieldable spring means outside the conduit for increasingly resisting damper pivotal movement as the damper pivots toward closed position.

12. For combination with means including a flow conduit for passing gas downstream and the conduit having an outlet through which gas may leave the conduit, the improvement assembly comprising a conduit section for passing gas flow, and a damper valve movable in said conduit section to decrease the flow area of a main orifice formed therein all in response to increasing differential pressure of said gas upstream and downstream of the damper valve, means mounting the damper valve for pivotal movement about an axis extending generally transversely of the conduit section, said section having a principal axis with respect to which said damper pivot axis is eccentrically spaced, a major portion of the damper projecting upstream from a plane normal to the principal axis of the conduit and passing through said transverse pivot axis in both open and closed positions of the damper, the damper valve having a substantially flat upstream side and the upstream and downstream extremities of the damper in closed position extending into close proximity to the inner surface of said section, and yieldable spring means for increasingly resisting damper pivotal movement as the damper pivots toward closed position.

13. For combination with means including a flow conduit for passing gas downstream and the conduit having an outlet through which gas may leave the conduit, the improvement assembly comprising a conduit section for passing gas flow, and a damper valve movable in said conduit section to decrease the flow area of a main orifice formed therein all in response to increasing differential pressure of said gas upstream and downstream of the damper valve, means mounting the damper valve for pivotal movement about an axis extending generally transversely of the conduit section, said section having a principal axis with respect to which said damper pivot axis is eccentrically spaced, a major portion of the damper projecting upstream from a plane normal to the principal axis of the conduit and passing through said transverse pivot axis in both open and closed positions of the damper, the damper valve having a convex upstream side, the entire damper periphery extending closely proximate the conduit section inner surface in damper closed position, and the damper itself being imperforate to prevent gas flow therethrough, and yieldable spring means for increasingly resisting damper pivotal movement as the damper pivots toward closed position.

14. The invention as defined in claim 10 in which said yieldable means comprises a series of spring elements mounted to be successively and cumulatively deflected in response to damper valve pivoting toward closed position.

15. Apparatus of the character described for use in a conduit having an outlet, comprising a conduit section for passing gas flow, a damper valve movable in said conduit section to decrease the flow area of a main orifice formed therein all in response to increasing differential pressure of said gas upstream and downstream of the damper valve, means mounting the damper valve for pivotal movement about an axis extending generally transversely of the conduit section, said section having a principal axis with respect to which said damper pivot axis is eccentrically spaced, the damper having open and closed positions in each of which a major portion of the damper projects upstream from a plane normal to the principal axis of the section and passing through said transverse pivot axis, and yieldable spring means for increasingly resisting damper pivotal movement as the damper pivots toward closed position.

16. The invention as defined in claim 15 in which said yieldable means comprises a series of spring elements mounted to be successively and cumulatively deflected in response to damper valve pivoting toward closed position.

References Cited by the Examiner

UNITED STATES PATENTS

| | | | |
|---|---|---|---|
| 586,561 | 7/97 | Mosher | 137—513.7 |
| 1,627,194 | 3/27 | Norberg | 230—17 |
| 1,788,358 | 1/31 | Georg | 137—513.7 |
| 2,465,125 | 3/49 | Schulz | 230—114 |
| 2,956,585 | 10/60 | Alsworth | 230—120 |

FOREIGN PATENTS 542,256  1/42  Great Britain.

MEYER PERLIN, *Primary Examiner.*